United States Patent Office 3,772,367
Patented Nov. 13, 1973

3,772,367
PROCESS FOR THE PRODUCTION OF
METHYL KETONES
Nazar S. Aprahamian, West Nyack, N.Y.; Aida O.
Aprahamian, executrix of the estate of said Nazar S.
Aprahamian, deceased, assignor to Union Carbide Corporation, New York, N.Y.
No Drawing. Filed June 13, 1972, Ser. No. 262,310
Int. Cl. C07c 49/06, 49/76
U.S. Cl. 260—590         16 Claims

ABSTRACT OF THE DISCLOSURE

A vapor phase process for the production of methyl ketones having the following structural formula:

$$CH_3\overset{O}{\overset{\|}{C}}CH_2CR^1R^2CR^3R^4H$$

wherein $R^1$, $R^2$, $R^3$, and $R^4$ are hydrogen, a straight or branched chain alkyl radical having 1 to 8 carbon atoms wherein the total number of carbon atoms in all of said alkyl radicals is no greater than 12 carbon atoms, a phenyl radical, or a phenyl radical wherein one to three hydrogen atoms are substituted by a straight chain alkyl radical having 1 to 3 carbon atoms, and wherein there are no more than 2 phenyl radicals, comprising admixing acetone with an olefin having the following structural formula:

$$R^1R^2C=CR^3R^4$$

wherein $R^1$, $R^2$, $R^3$, and $R^4$ are as defined above at a temperature in the range of about 300° C. to about 650° C. wherein the molar ratio of acetone to olefin is in the range of about 0.1 mol to about 10 mols of acetone per mole of olefin, and wherein the initiator is present in an amount of about 0.5 mol percent to about 30 mol percent based on the total mols of acetone and olefin in the admixture and the initiator is selected from the group consisting of unsubstituted straight or branched chain alkyl aldehydes having two to seven carbon atoms and unsubstituted straight or branched chain alkyl formates wherein the alkyl radical has 1 to 10 carbon atoms.

FIELD OF THE INVENTION

This invention relates to a process for the production of methyl ketones and, more particularly, to the production of such ketones by effecting a reaction between an olefin and acetone.

DESCRIPTION OF THE PRIOR ART

Methyl isobutyl ketone (MIBK) is a well known industrial solvent for the most commonly used coating resins such as nitrocellulose, acrylates, vinyls, and alkyds.

Branched ketones exemplified by MIBK have recently come under fire as pollutants since they are considered to be "photochemically active" and thus detrimental to the environment. Local air pollution regulations such as Rule 66 in Los Angeles County, California and Regulation V in Philadelphia, Pa. have severely circumscribed the use of such branched ketones.

As a substitute for MIBK, methyl-n-butyl ketone (MNBK) has been proposed and accepted, not only because it is considered to be a non-pollutant, but because of its superiority in applications similar to MIBK.

A need has arisen, therefore, for a simple and economical process for the production of MNBK and the like using easily available low cost reactants especially processes having high conversions with relatively short reaction times.

SUMMARY OF THE INVENTION

An object of this invention, then, is to provide a simple, economical high conversion route to methyl ketones by using inexpensive common reactants.

Other objects and advantages will become apparent hereinafter.

According to the present invention, a vapor phase process has been discovered for the production of methyl ketones having the following structural formula:

$$CH_3\overset{O}{\overset{\|}{C}}CH_2CR^1R^2CR^3R^4H$$

wherein $R^1$, $R^2$, $R^3$, and $R^4$ are hydrogen, a straight or branched chain alkyl radical having 1 to 8 carbon atoms wherein the total number of carbon atoms in all of said alkyl radicals is no greater than 12 carbon atoms, a phenyl radical, or a phenyl radical wherein one to three hydrogen atoms are substituted by a straight or branched chain alkyl radical having 1 to 3 carbon atoms, and wherein there are no more than 2 phenyl radicals, comprising admixing acetone with an olefin having the following structural formula:

$$R^1R^2C=CR^3R^4$$

wherein $R^1$, $R^2$, $R^3$, and $R^4$ are as defined above at a temperature in the range of about 300° C. to about 650° C. wherein the molar ratio of acetone to olefin is in the range of about 0.1 to about 10 mols of acetone per mol of olefin, and wherein the initiator is present in an amount of about 0.5 mol percent to about 30 mol percent based on the total mols of acetone and olefin in the admixture and the initiator is selected from the group consisting of unsubstituted straight or branched chain alkyl aldehydes having two to seven carbon atoms and unsubstituted straight or branched chain alkyl formates wherein the alkyl radical has 1 to 10 carbon atoms.

The reaction can be characterized as a high temperature condensation or coupling reaction of an olefin with acetone. The process in which the reaction takes place appears advantageous because it can be performed in one step using low cost materials and has a fast reaction rate and, consequently, good conversions with a relatively short reaction time.

DESCRIPTION OF THE PREFERRED EMBODIMENT

The process can be carried out by feeding a mixture of acetone and olefin into a reaction vessel. The inner surface of the reaction vessel which is in contact with the reaction mixture is preferably an inert material such as glass. "Pyrex" and "Vycor" heat and chemical resistant glassware are particularly suitable. A glass-lined polytetrafluoroethylene coated stainless steel autoclave can be used advantageously, but the use of metal surfaces such as stainless steel in contact with the reaction mixture, while suitable, will generally give lower efficiencies. Tubular, back-mixed, or look reactors made of such materials can also be used together with multi-point injection to maintain a particular ratio of reactants.

The olefin used in the instant reaction can be defined as having the following structural formula:

$$R^1R^2C=CR^3R^4$$

wherein $R^1$, $R^2$, $R^3$, and $R^4$ are as defined above. Examples of the olefin are ethylene, propylene, n-butene, n-pentene, n-hexene, n-heptene, n-octene, styrene, hexene-3, heptene-2, heptene-3, octene-2, octene-3, octene-4, isobutylene, isopentene, and various branched chain isomers of the formulas $C_5H_{10}$, $C_6H_{12}$, $C_7H_{14}$, and $C_{10}H_{20}$, for example. It should be pointed out that where branched chain olefins are used, a branched ketone will be the major product as a general rule.

The most useful commercially of the olefins in view of the products produced are ethylene, propylene, n-butene, and styrene.

In batch and semi-continuous processes, the acetone is generally introduced into the reaction vessel in liquid form. In continuous processes, however, pre-vaporization is preferable prior to introduction of the acetone into the reactor although the liquid form can be used if desired.

The olefin is generally introduced into the reactor in the same state that it is in at room temperature and atmospheric pressure; however, it can be introduced in gaseous or liquid form as desired. In continuous processes, again, it is preferable to pre-vaporize the liquid olefins prior to introduction into the reactor.

The amounts of acetone and olefin introduced initially into the reactor can be defined in molar ratios. The molar ratio of acetone to olefin can be in the range of about 0.1 mol to about 10 mols of acetone per mol of olefin and is preferably in the range of about 0.5 to about 2 mols of acetone per mol of olefin.

Prior to or at the same time as the introduction of the olefin and acetone, the initiator is introduced into the reaction vessel in an amount of about 0.5 mol percent to about 30 mol percent based on the total mols of acetone and olefin introduced into the admixture and, preferably, in an amount of about 1.5 mol percent to about 20 mol percent.

The initiator can be an unsubstituted straight or branched chain alkyl aldehyde having two to seven carbon atoms. Examples of aldehydes of this type are acidaldehyde, propionaldehyde, n - butyraldehyde, isobutyraldehyde, n-valeraldehyde, isovaleraldehyde, n-caproaldehyde, n-heptaldehyde, and trimethylacidaldehyde. The initiator can also be an unsubstituted straight or branched chain alkyl formate wherein the alkyl radical has 1 to 10 carbon atoms. Examples of formates of this type are methyl formate, ethyl formate, propyl formate, n-butyl formate, isobutyl formate, pentyl formate, heptyl formate, and isooctyl formate.

The temperature of the reactor is maintained in the range of about 300° C. to about 650° C. and is, preferably, in the range of about 375° C. to about 575° C. Temperatures are particularly important in this reaction, and the efficiencies of the desired product will be affected on a divergence of more than 25° C. from the recited preferred range.

The pressure in the reactor can be maintained in the range of about 50 p.s.i.a. (pounds per square inch absolute) to about 3000 p.s.i.a. and is, preferably, in the range of about 600 p.s.i.a. to about 1600 p.s.i.a. Pressures as low as atmospheric pressure can be used, but at low pressures the reaction rate is so slow and, consequently, the productivity is so low that low pressures are not commercially feasible. Higher pressures can also be used, but, again, these pressures are not commercially feasible or practical. The pressures in the examples are stated in terms of p.s.i.g. which is about one atmosphere greater than p.s.i.a.

The interior of the reaction vessel should be essentially oxygen-free and, to this end, can be evacuated or an atmosphere comprising nitrogen or other inert gas can be used.

Batch, semi-continuous, or continuous operations can be used and there is no special order for the introduction of the reactants; however, the initiator should be present initially for best results.

Although this is a catalytic reaction, care should be taken to use inert reactor surfaces rather than, for example, stainless steel, if optimum efficiencies are to be attained.

Recovery, separation and analysis of products and unreacted materials are accomplished by conventional means.

Analysis of the products of a typical batch run of subject process wherein acetone and propylene are reacted is as follows: methyl n-butyl ketone, methyl isobutyl ketone, and methyl cyclopentane as major products; isopropyl cyclohexane, n-propyl cyclohexane and xylenes in intermediate quantities; and small quantities of methyl ethyl ketone, 3-methyl cyclohexene, 5-hexene-2-one, and toluene are also found. In the presence of acid washed stainless steel wool, a major product is mesityl oxide and some 2-methyl-1-pentane-4-one is found.

The following examples illustrate the invention.

Examples 1 to 10

The reactions are carried out in a one liter glass lined stainless steel autoclave fitted with a stirrer, thermocouple and a sampling line attached to a valve for withdrawing samples. Two 150 milliliter capacity cylindrical stainless steel reservoirs are fitted with two valves each. One of the valves of each cylinder is connected with a $\frac{1}{16}$ inch stainless steel tube to the reactor. The other valve is connected to a pressurized nitrogen cylinder.

The reactor is swept with nitrogen to remove the air and then is heated to the desired temperature and the agitator is turned on. In one reservoir the required amount of propylene is introduced while in the other a predetermined mixture of acetone and initiator is introduced. The reactants are forced into the reactor by use of nitrogen pressure and opening the inlet valves. The pressure of the system is adjusted by introducing nitrogen into the system. Samples of the reaction mixture are withdrawn at intervals and analyzed.

Reaction products are analyzed by the use of a vapor phase chromatograph (VPC).

Amounts of the reactants, propylene and acetone, and initiator, in millimols; the amounts of the products, MNBK and MIBK, in percent by weight of total products formed; temperature range in ° C.; initial pressure in pounds per square inch gauge (p.s.i.g.); reaction time in minutes; and, in some cases, percent conversion are set forth in the table below. Percent conversion is calculated as follows:

$$\frac{\text{area of acetone}}{\text{total area of components}} \times 100$$

= weight percent of unreacted acetone 100 minus weight percent of unreacted acetone=weight percent acetone converted, i.e., percent conversion Note: area is taken from a chromatogram and area percent is approximately equal to weight percent.

I claim:
1. A vapor phase process for the production of methyl ketones having the following structural formula:

$$CH_3\overset{O}{\overset{\|}{C}}CH_2CR^1R^2CR^3R^4H$$

wherein $R^1$, $R^2$, $R^3$, and $R^4$ are hydrogen, a straight or branched chain alkyl radical having 1 to 8 carbon atoms wherein the total number of carbon atoms in all of said alkyl radicals is no greater than 12 carbon atoms, a phenyl radical, or a phenyl radical wherein one to three hydrogen atoms are substituted by a straight or branched chain alkyl radical having 1 to 3 carbon atoms, and wherein there are no more than 2 phenyl radicals, comprising admixing acetone with an olefin having the following structural formula:

$$R^1R^2C=CR^3R^4$$

wherein $R^1$, $R^2$, $R^3$, and $R^4$ are as defined above at a temperature in the range of about 300° C. to about 650° C. wherein the molar ratio of acetone to olefin is in the range of about 0.1 mol to about 10 mols of acetone per mol of olefin, and wherein an initiator is present in an amount of about 0.5 mol percent to about 30 mol percent based on the total mols of acetone and olefin in the admixture and the initiator is selected from the group consisting of unsubstituted straight or branched chain alkyl aldehydes having two to seven carbon atoms and unsubstituted straight or branched chain alkyl formates wherein the alkyl radical has 1 to 10 carbon atoms.

2. The process defined in claim 1 wherein the molar ratio of acetone to olefin is in the range of about 0.5 mol to about 2 mols per mol of olefin.

3. The process defined in claim 2 wherein the temperature is in the range of about 375° C. to about 575° C.

4. The process defined in claim 1 wherein the olefin is selected from the group consisting of ethylene, propylene, n-butene, and styrene.

5. The process defined in claim 2 wherein the olefin is selected from the group consisting of ethylene, propylene, n-butene, and styrene.

6. The process defined in claim 3 wherein the olefin is selected from the group consisting of ethylene, propylene, n-butene, and styrene.

7. The process defined in claim 3 wherein the olefin is ethylene.

8. The process defined in claim 3 wherein the olefin is propylene.

9. The process defined in claim 3 wherein the olefin is n-butene.

10. The process defined in claim 3 wherein the olefin is styrene.

11. The process defined in claim 6 wherein the initiator is present in an amount in the range of about 1.5 mol percent to about 20 mol percent.

12. The process defined in claim 11 wherein the initiator is acetaldehyde or isobutyraldehyde.

13. The process defined in claim 11 wherein the initiator is ethyl formate.

14. The process defined in claim 1 wherein the pressure is in the range of about 50 p.s.i.a. to about 3000 p.s.i.a.

15. The process defined in claim 3 wherein the pressure is in the range of about 600 p.s.i.a. to about 1600 p.s.i.a.

16. The process defined in claim 6 wherein the pressure is in the range of about 600 p.s.i.a. to about 1600 p.s.i.a.

References Cited
UNITED STATES PATENTS 3,655,768    4/1972    Pommer et al.
3,637,857    1/1972    Bakke et al.

DANIEL D. HORWITZ, Primary Examiner

U.S. Cl. X.R.

260—593, 601 R; 252—364